US008741457B2

(12) United States Patent
Toia et al.

(10) Patent No.: US 8,741,457 B2
(45) Date of Patent: Jun. 3, 2014

(54) RECHARGEABLE LITHIUM BATTERIES COMPRISING MEANS FOR THE SORPTION OF HARMFUL SUBSTANCES IN THE FORM OF A MULTILAYER POLYMERIC SHEET

(75) Inventors: Luca Toia, Carnago (IT); Johnny Mio Bertolo, Fiume Veneto (IT); Giorgio Longoni, Monza (IT); Marco Amiotti, Cornaredo (IT)

(73) Assignee: Saes Getters S.p.A., Lainate (MI) (IT)

( * ) Notice: Subject to any disclaimer, the term of this patent is extended or adjusted under 35 U.S.C. 154(b) by 1119 days.

(21) Appl. No.: 12/600,454

(22) PCT Filed: Jun. 4, 2008

(86) PCT No.: PCT/EP2008/056879
§ 371 (c)(1),
(2), (4) Date: Nov. 16, 2009

(87) PCT Pub. No.: WO2008/148778
PCT Pub. Date: Dec. 11, 2008

(65) Prior Publication Data
US 2010/0183914 A1    Jul. 22, 2010

(30) Foreign Application Priority Data
Jun. 5, 2007 (IT) .............................. MI2007A1148

(51) Int. Cl.
*H01M 10/34* (2006.01)
(52) U.S. Cl.
USPC ....................................... 429/57; 429/231.95
(58) Field of Classification Search
None
See application file for complete search history.

(56) References Cited

U.S. PATENT DOCUMENTS

| 4,448,860 | A | 5/1984 | Von Alpen et al. |
| 4,830,643 | A | 5/1989 | Sassa et al. |
| 5,091,223 | A | 2/1992 | Mori et al. |
| 5,264,301 | A | 11/1993 | Sindorf et al. |
| 5,445,856 | A | 8/1995 | Chaloner-Gill |
| 5,743,942 | A | 4/1998 | Shelley et al. |
| 6,063,307 | A | 5/2000 | Shepodd et al. |
| 6,428,612 | B1 | 8/2002 | McPhilmy et al. |
| 6,503,659 | B1 | 1/2003 | Ovshinsky et al. |
| 7,776,465 | B1 | 8/2010 | Hatazawa et al. |
| 2002/0164441 | A1 | 11/2002 | Amine et al. |

(Continued)

FOREIGN PATENT DOCUMENTS

| CN | 1198475 | 11/1998 |
| CN | 1298212 | 6/2001 |

(Continued)

OTHER PUBLICATIONS

Kumai, K., et al. Gas generation mechanism due to electrolyte decomposition in commercial lithium-ion cell. Journal of Power Sources, 81-82, pp. 715-719 (2009).

(Continued)

*Primary Examiner* — Maria J Laios
(74) *Attorney, Agent, or Firm* — Steinfl & Bruno, LLP

(57) ABSTRACT

Rechargeable lithium batteries are described comprising an airtight container, electrodes immersed in an electrolytic solution and spaced apart by means of one or more separators, electrical contacts connected to the electrodes and a means for sorbing harmful substances formed of a multilayer polymeric sheet (10) comprised of an inner layer (12) of a polymeric material containing particles (11) of one or more getter materials for the sorption of the harmful substances, and at least one external protective layer (13) of a polymeric material impermeable to the electrolyte, wherein all the polymeric materials are permeable to the harmful substances.

31 Claims, 3 Drawing Sheets

(56) References Cited

U.S. PATENT DOCUMENTS

| | | |
|---|---|---|
| 2003/0049519 A1 | 3/2003 | Ishida et al. |
| 2004/0054057 A1 | 3/2004 | Bauer et al. |
| 2005/0069763 A1 | 3/2005 | Hong et al. |
| 2005/0130044 A1 | 6/2005 | Aoshima et al. |
| 2005/0241478 A1 | 11/2005 | Henrik |
| 2006/0073365 A1 | 4/2006 | Kaye |
| 2006/0286448 A1 | 12/2006 | Snyder et al. |
| 2007/0042264 A1 | 2/2007 | Desilvestro et al. |
| 2007/0254209 A1 | 11/2007 | Baba et al. |
| 2008/0121105 A1 | 5/2008 | Schubert et al. |

FOREIGN PATENT DOCUMENTS

| | | |
|---|---|---|
| CN | 1399366 | 2/2003 |
| CN | 1796579 | 7/2006 |
| CN | 200880018464 | 3/2010 |
| EP | 0075132 | 3/1983 |
| EP | 0 605 734 | 7/1994 |
| EP | 1 107 336 | 6/2001 |
| EP | 1107336 | 6/2001 |
| EP | 1990848 | 2/2008 |
| EP | 1990848 | 12/2008 |
| EP | 08760465 | 2/2010 |
| JP | 10255860 | 9/1998 |
| JP | 11-307131 | 11/1999 |
| JP | 2000338424 | 12/2000 |
| JP | 2001126766 | 5/2001 |
| JP | 2001-155790 | 8/2001 |
| JP | 2002237333 | 8/2002 |
| JP | 2003501556 | 1/2003 |
| JP | 2003-077549 | 3/2003 |
| JP | 2003088574 | 3/2003 |
| JP | 2003151558 | 5/2003 |
| JP | 2003/197487 | 11/2003 |
| JP | 2004152619 | 5/2004 |
| JP | 2005-056672 | 3/2005 |
| JP | 2006-512186 | 4/2006 |
| JP | 2007090434 | 4/2007 |
| JP | 2007220698 | 8/2007 |
| JP | 2008-235256 | 2/2008 |
| JP | 2008025119 | 2/2008 |
| JP | 20100510774 | 8/2010 |
| WO | 0075950 | 12/2000 |
| WO | 2005/067645 | 7/2005 |
| WO | 2005/107334 | 11/2005 |
| WO | 2006110740 | 10/2006 |
| WO | 2007/066372 | 6/2007 |
| WO | 2007/080614 | 7/2007 |
| WO | 2008148781 | 12/2008 |

OTHER PUBLICATIONS

Vetter, J., et al. In situ study on $CO_2$ evolution at lithium-ion battery cathodes. Journal of Power Sources, 159, pp. 277-281 (2006).

Non-Final Office Action for U.S. Appl. No. 12/600,461, filed Nov. 16, 2009 in the name of Luca Toia et al. Mail Date: Jun. 6, 2012.

PCT International Search Report for PCT/EP2008/056879 filed on Jun. 4, 2008 in the name of Saes Getters S.P.A.

PCT Written Opinion for PCT/EP2008/056879 filed on Jun. 4, 2008 in the name of Saes Getters S.P.A.

PCT International Preliminary Report on Patentability for PCT/EP2008/056879 filed on Jun. 4, 2008 in the name of Saes Getters S.P.A.

PCT International Search Report for PCT/EP2008/056882 filed on Jun. 4, 2008 in the name of Saes Getters S.P.A.

PCT International Written Opinion for PCT/EP2008/056882 filed on Jun. 4, 2008 in the name of Saes Getters S.P.A.

PCT International Preliminary Report on Patentability for PCT/EP2008/056882 filed on Jun. 4, 2008 in the name of Saes Getters S.P.A.

Notification of the First Office Action mailed Jun. 12, 2011 for Chinese Patent Application 200880018464.8 filed on Jun. 4, 2008 (English + Chinese).

Rejection Decision mailed on Apr. 6, 2012 for Chinese Patent Application 200880018464.8 filed on Jun. 4, 2008 (English + Chinese).

Notice of Reasons for Rejection mailed on Feb. 5, 2013 for Japanese Patent Application 2010-510774 filed on Feb. 4, 2010 (English + Japanese).

McKinney, P. "Absorption of Gases on Palladium Oxide" Contribution from the School of Chemistry of Rutgers University vol. 55 p. 3636.

Abstract of—Pillia U, et al. "Room temperature oxidation of carbon monoxide over copper oxide catalyst" Applied Catalysis B: Environmental vol. 64, Issues 1-2, Apr. 18, 2000, pp. 146-151.

Final Office Action mailed on Dec. 18, 2012 for U.S. Appl. No. 12/600,461 mailed on Dec. 18, 2012 filed Nov. 16, 2009 in the name of Luca Toia.

Notice of Allowance mailed on Apr. 4, 2013 for U.S. Appl. No. 12/600,461 mailed on Dec. 18, 2012 filed Nov. 16, 2009 in the name of Luca Toia.

Chinese Office Action mailed on Dec. 16, 2011 issued for Chinese Application 200880018895.4 filed Nov. 16, 2009 in the name of Saes Getters S.P.A.(Chinese + English).

Response to Chinese Office Action issued on Dec. 16, 2011 for Chinese Application 2008001895.4 filed Nov. 16, 2009 in the name of Saes Getters S.P.A.(Chinese + English).

European Communication 94(3) mailed on Dec. 28, 2011 issued for European Application 08760465.8 filed on Nov. 16, 2009 in the name of Saes Getters S.P.A.

Response submitted on Mar. 13, 2012 to EP Communication 94(3) mailed on Dec. 28, 2011 issued for European Application 08760465.8 filed on Nov. 16, 2009 in the name of Saes Getters S.P.A.

European Communication 94(3) mailed on Jan. 27, 2011 issued for European Application 08760465.8 filed on Nov. 16, 2009 in the name of Saes Getters S.P.A.

Response submitted on Apr. 11, 2011 to EP Communication 94(3) mailed on Dec. 27, 2011 issued for European Application 08760465.8 filed on Nov. 16, 2009 in the name of Saes Getters S.P.A.

European Communication 94(3) mailed on Apr. 8, 2010 issued for European Application 08760465.8 filed on Nov. 16, 2009 in the name of Saes Getters S.P.A.

Response submitted on Jun. 8, 2010 to EP Communication 94(3) mailed on Apr. 8, 2011 issued for European Application 08760465.8 filed on Nov. 16, 2009 in the name of Saes Getters S.P.A.

Restriction Requirement mailed on Sep. 21, 2012 issued for U.S. Appl. No. 12/600,454, filed Nov. 16, 2009 in the name of Luca Toia et al.

Notice of Reasons for Rejection mailed on Feb. 19, 2013 for Japanese Patent Application 2010-510776 filed on Feb. 4, 2010.

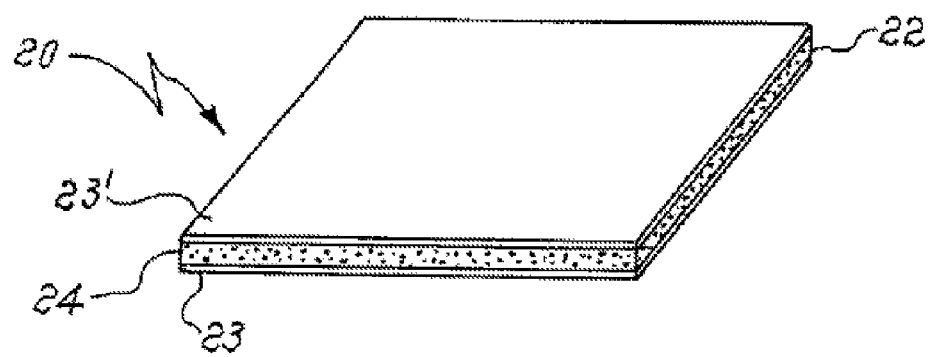
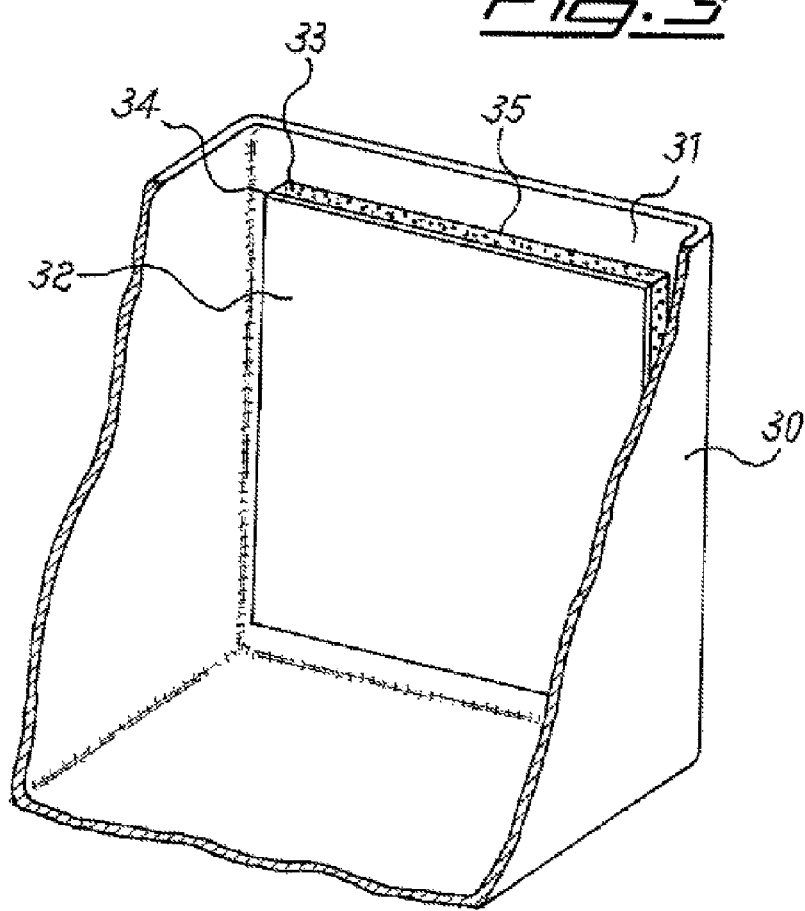

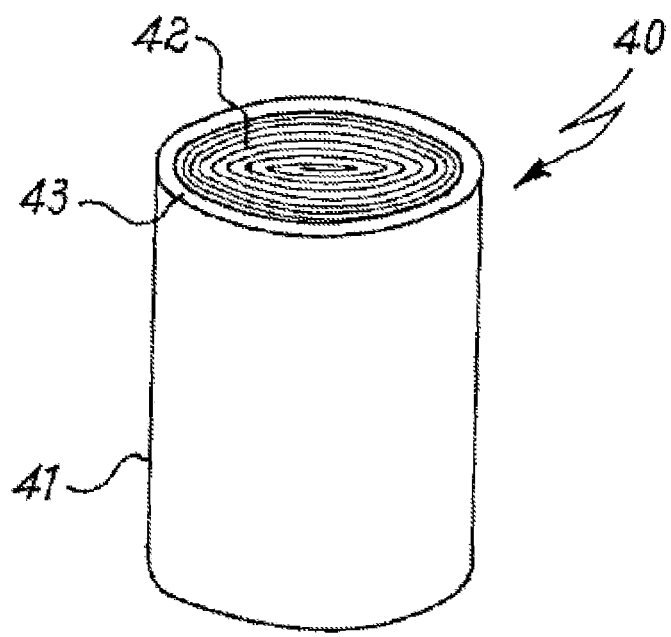
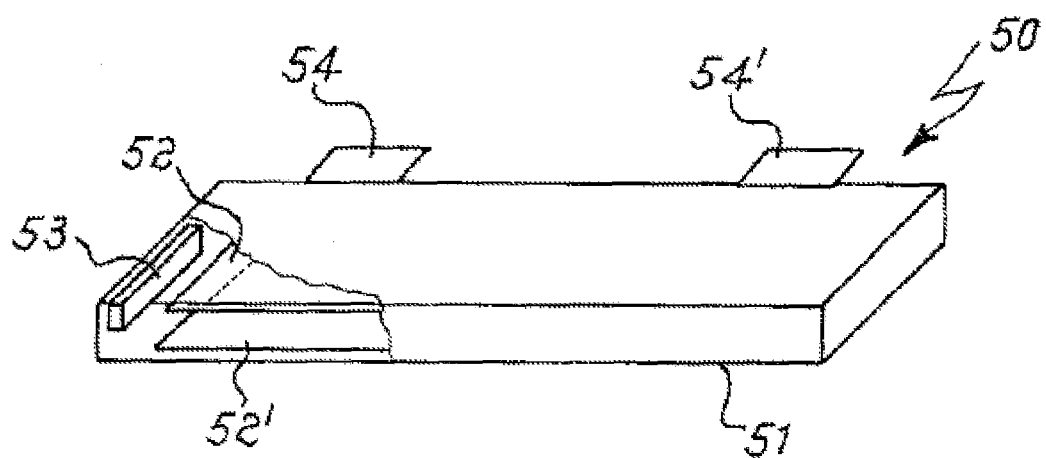

RECHARGEABLE LITHIUM BATTERIES COMPRISING MEANS FOR THE SORPTION OF HARMFUL SUBSTANCES IN THE FORM OF A MULTILAYER POLYMERIC SHEET

CROSS REFERENCE TO RELATED APPLICATIONS

The present application is the national stage of International Application PCT/EP2008/056879 filed on Jun. 4, 2008 which, in turn, claims priority to Italian Application MI2007A001148, filed on Jun. 5, 2007. The present application may also be related to U.S. patent application Ser. No. 12/600,461 which, in turn, is the National Stage of International Application PCT/EP2008/056882.

The present invention relates to rechargeable lithium batteries containing means capable of sorbing the harmful substances generated by these batteries during their use.

Rechargeable lithium batteries are used in several electronic apparatuses thanks to their greater capacity and power and energy density. Recent developments of these batteries that have further improved their performances allow their use also in hybrid and totally electric vehicles.

Rechargeable lithium batteries and their operation principle are widely known. In particular a lithium battery comprises two electrodes (anode and cathode) spaced apart by means of a separator and immersed in an electrolyte. The oxidation reaction occurs on the anode and allows to release electrons into the electric circuit, whereas the reduction reaction occurs on the cathode and allows to reintroduce electrons into the battery through the electric circuit. The electrolyte has the purpose of completing the electric circuit of the battery thus allowing the ions transportation from one electrode to the other, whereas the separator has the function of preventing a short-circuit between cathode and anode.

Therefore, lithium batteries are essentially comprised of an airtight container inside which are arranged electrodes (anode and cathode) immersed or impregnated with special electrolytic solutions and spaced apart by means of a separator, and electrical contacts whose purpose is to put in communicating a portion of these electrodes with the outside of the battery.

As to the cathode, typically a 20 μm thick aluminum sheet is coated with oxides such as $LiCoO_2$, $LiNiO_2$, $LiMn_2O_4$, $LiFePO_4$; also mixed oxides of Ni and Co according to the formula $LiCo_xNi_{1-x}O_2$ may be employed for this purpose. While the anode is typically made of a copper sheet coated with graphite. In the rest of the description of the invention anode and cathode will no longer be distinguished, but these elements will be generically identified with the term electrode.

As to electrolytic solutions, these are typically formed of an organic solvent and a ionic salt. As to the ionic salt, lithium hexafluorophosphate ($LiPF_6$) is one of the mostly used, whereas concerning solvents, among the mostly used ones are propylene carbonate (PC), dimethyl carbonate (DMC), diethyl carbonate (DEC), ethyl carbonate (EC) and dimethyl ethane (DME) used alone, or more commonly a mixture of two or more components is used.

The separator is generally made of a porous polymeric material that is permeable to lithium ions.

Harmful substances, being often in a gaseous form, may be generated inside lithium batteries during the use, which may damage the batteries even in an irreparable manner. Another possible source of harmful substances may be due to the desorption of some materials used inside the battery. More details about the mechanisms generating harmful species inside lithium batteries may be found in the article "Gas generation mechanism due to electrolyte decomposition in commercial lithium-ion cell", by Kumai et. al. published in 1999 on the Journal of Power Sources, pages 715-719 and in the article "In situ study on $CO_2$ evolution at lithium-ion battery cathodes", by Vetter et al., published in 2006 on the Journal of Power Sources, pages 277-281.

Carbon dioxide ($CO_2$), carbon monoxide (CO), saturated and unsaturated hydrocarbons, oxygen ($O_2$) and hydrofluorhydric acid (HF) are among the most harmful gaseous species, whereas water ($H_2O$), which is another very harmful species, is typically present in the liquid phase dissolved in the electrolytic solution. $CO_2$ may also be present in the liquid phase, although the major risks associated to its presence inside the battery are due to its gaseous phase.

In the lithium batteries made according to the prior art, getter materials are used for the manufacturing of composite barriers, i.e. their function is to prevent impurities from entering the electrochemical cell rather than sorbing the gases present or generated therein.

In particular, patent application US 2007/0042264 mentions the presence of barrier layers for the sorption of $H_2O$ in the region where the battery is sealed, while in this document the presence of getter materials in lithium batteries is considered useful without describing the methods for introducing getter materials inside the electrochemical device.

The possible use of barrier layers made of getter materials inside lithium batteries is also described in patent application WO 2005/067645 and in patent application US 2006/0286448.

All these solutions do not tackle the problem of the compatibility between the getter material and the electrolyte. The getter material in fact must be completely inert with respect to the electrolyte, both in order not to jeopardize its sorbing properties and to avoid the release of substances being harmful for the battery operation as a consequence of the reaction between the getter material and the electrolyte. Such compatibility must be ensured also after the getter material has carried out its function by bonding to harmful species present inside the battery. Moreover, these known solutions are suitable for preventing harmful species from entering the battery or for slowing down their ingress, but they are not efficient as to the sorption of harmful substances being generated or present inside the battery.

In a first aspect thereof the present invention relates to a rechargeable lithium battery being able to overcome the problems still present in the prior art, and it consists in a rechargeable lithium battery comprising an airtight container, electrodes immersed in an electrolytic solution, said electrodes being spaced apart by means of one or more separators, electrical contacts connected to the electrodes and a means for sorbing harmful substances, characterized in that said means for sorbing harmful substances is a multilayer polymeric sheet formed of an inner layer of a polymeric material containing particles of one or more getter materials for the sorption of said harmful substances, and at least one external protective layer of a polymeric material being impermeable to the electrolyte, wherein all the polymeric materials are permeable to said harmful substances.

The invention will be described with reference to the following drawings, wherein:

FIG. 2 shows an alternative embodiment of a means for sorbing harmful substances in rechargeable lithium batteries;

FIG. 3 shows a view of a portion of a wall of a rechargeable lithium battery, on which a means for sorbing harmful substances is fixed;

FIG. 4 shows a cross-sectional view of a lithium battery containing a means for sorbing harmful substances in the form of a multilayer polymeric sheet according to a first embodiment; and FIG. 5 shows a second embodiment of a lithium battery containing a means for the sorption of harmful substances in the form of a multilayer polymeric sheet.

Figure 1:
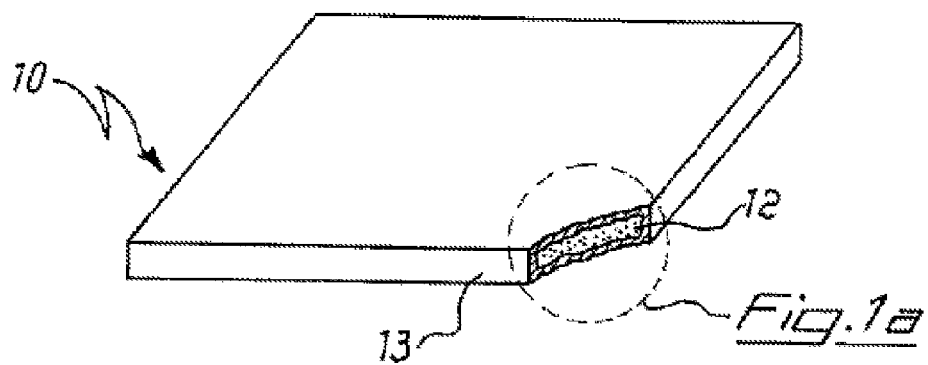
FIG. 1 shows a broken view of a first embodiment of the means for sorbing harmful substances in rechargeable lithium batteries.

The size and the dimensional ratios of the various elements shown in the drawings are not correct, but have been altered in order to help understanding the drawings themselves. Moreover, still for the same reason, some characteristic components of the batteries, such as for example the separators, have not been shown.

Patent application WO 2007/066372 in the applicant's name shows an electrolytic capacitor comprising a sorber of impurities made of a multilayer polymeric sheet, wherein the innermost layer comprises particles of one or more getter materials capable to sorb species being harmful for the operation of the device, that rather than being employed in a rechargeable lithium battery, is used in a different energy storage device (electrolytic capacitor).

For the manufacturing of the rechargeable lithium batteries of the invention it is necessary that the means for sorbing harmful substances have at least one layer made of a protective polymeric material, i.e. being permeable to harmful species but impermeable to the electrolyte and coating at least one of the two main surfaces of the inner layer containing getter material particles.

Figure 1A:
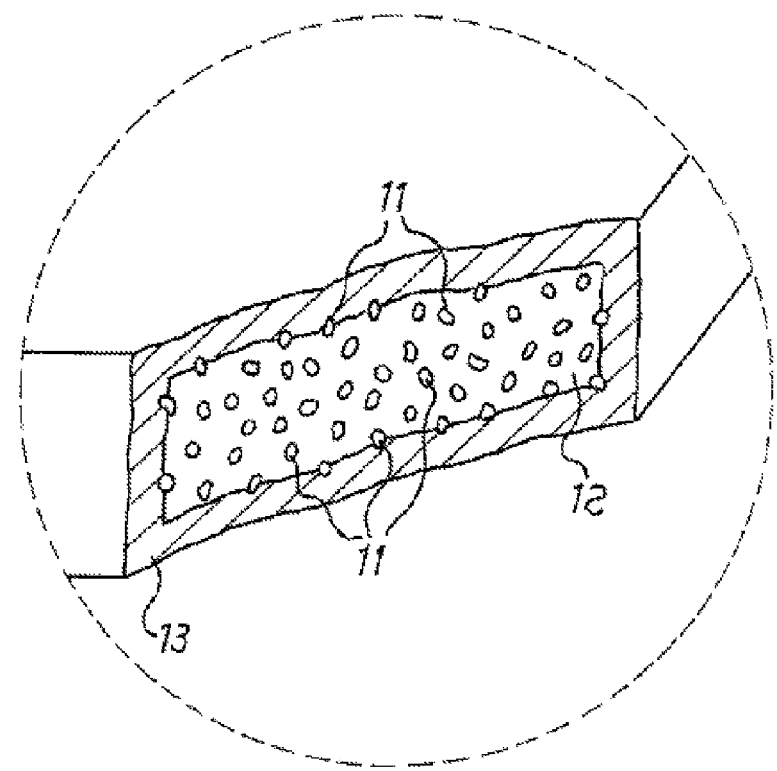
FIG. 1a is an enlarged view of a detail of FIG. 1.

FIG. 1 and the enlarged view of FIG. 1a show a cross-section of a polymeric multilayer sheet 10 for the sorption of harmful substances in rechargeable lithium batteries, wherein the getter material particles 11 are dispersed in an inner layer 12 of a polymeric material, which is permeable to harmful substances and in turn is completely enclosed in a polymeric material layer 13 that is permeable to the substances to be sorbed but impermeable to the electrolyte, thus protecting the getter material from the chemical attack of the electrolyte. This allows to freely choose the getter material, thus being not bound to the characteristics of the electrolyte present in the battery.

Alternatively, the protective polymeric layer only partially coats the inner polymeric layer containing the getter.

In a first embodiment according to this way of proceeding, which is shown in FIG. 2, the means for sorbing harmful substances are in the form of a multilayer 20 comprising a layer 22 of a polymeric material containing a getter material and two layers 23, 23' of a protective polymeric material arranged on the two main surfaces of layer 22, thus leaving the edges of layer 22 exposed. The reduced size of surface 24 exposed to the electrolyte does not jeopardize the functionality of the whole system.

When the means for the sorption of harmful substances are arranged against the inner walls of the rechargeable lithium battery, there is no need for a protective layer between the layer containing a getter material and the inner wall on which the means is fixed. This protection is required for the surface facing the electrolyte only, i.e. facing the inside of the battery. Such an arrangement is represented in FIG. 3, which shows a portion of an airtight container 30 represented by means of a flat wall (however other geometries may also be employed) on which a means 32 for the sorption of harmful substances, which is formed of a layer 33 containing getter material particles, and a protective layer 34, which is permeable to harmful substances but not to the electrolyte, are adhered. The means 32 for the sorption of harmful substances is represented in a configuration similar to the one shown for the multilayer sheet 20, with an edge 35 of layer 33 facing the electrolyte, however the protective polymeric layer 34 may be fixed to surface 31 along the entire periphery of layer 33, in order to completely enclose and protect it or to be more precise protecting the getter material particles enclosed (the latter embodiment is not shown in the drawings).

Layers of a polymeric material containing getter material particles are described in the international patent application WO 2005/107334A1 that relates to the purification of the inner atmosphere of organic electroluminescent displays. However, these layers containing a getter material are not provided with a polymeric protective layer, which has a fundamental importance for carrying out the present invention.

Sheets formed of polymeric material layers comprising a getter material and a further protective layer, being also made of a polymeric material, are described in patent U.S. Pat. No. 5,091,233. In this case these materials are used for the manufacturing of evacuated panels and the purpose of the polymeric film protecting the getter material is to slow down the permeation of gaseous substances rather than carrying out a selective permeation for the protection of the getter material itself as in the present invention.

The inner polymeric layer containing a getter material may be manufactured by means of an extrusion process and a subsequent rolling of a mix comprising a polymer in the semi-solid state and powders of a getter material being dispersed therein as uniformly as possible. In order not to jeopardize the mechanical characteristics and the integrity of the polymeric film containing the getter material and to avoid dangerous particle losses, the weight percentage of the particles of one or more getter materials must not be higher than 50% and in a preferred embodiment lower than 40%.

As to the materials forming the protective polymeric layer, the inventors have found that suitable materials for carrying out the invention are polyolefins, referring in particular to polyethylene, and in particular low density polyethylene (LDPE), polypropylene (PP), polystyrene and thermoplastic olefins (TPE), or fluorinated polymers such as polytetrafluoroethylene (PTFE).

These materials are also suitable for the manufacturing of the polymeric layer containing a getter material. In a preferred embodiment the same type of polymer is used for both the manufacturing of the polymeric layer containing a getter material and the manufacturing of the protective layer.

Alternatively, the layer containing a getter material may be manufactured with polymers having a lower chemical resistance and a high permeability to the gas to be sorbed, such as ethyl-vinyl-acetate (EVA) or polyesters such as polycarbonate.

The polymeric material layers forming the multilayer sheet may be joined to each other through various processes widely known in the field, e.g. by co-extrusion, co-rolling or pressure die casting.

The getter materials used according to the present invention in the means for removing harmful substances are of many types, on the basis of the harmful substances to be removed from the battery. The nature of these substances, for each type of lithium battery, may be determined through preliminary tests carried out on batteries being not provided with means for the removal of such harmful substances.

When the harmful substance is $H_2O$ it is possible to use oxides of alkaline-earth metals (preferred oxides of this type are magnesium and calcium oxides), boron oxide or zeolites of various nature.

When the harmful substance is carbon dioxide, suitable getter materials for carrying out the invention are carbon molecular sieves (CMS), hydroxides of alkaline and alkaline-earth metals (lithium and sodium in particular), lithium salts like $LiXO_y$, with X chosen among zirconium, iron, nickel, titanium, silicon and y comprised between 2 and 4, MOF (Metal Organic Framework) suitably modified by means of the addition of basic functional groups, such as aminic groups. In some cases, such as when the hydroxides of alkaline and alkaline earth metals are use for the $CO_2$ removal it is particularly useful to employ also a $H_2O$ removal getter material.

When the harmful substance is carbon monoxide in the gaseous phase, cobalt (II, III) oxide $Co_3O_4$, copper (II) oxide CuO, or potassium permanganate $KMnO_4$ may be used, to be preferably used in combination with a $CO_2$ sorber. These materials may possibly be used in combination with oxidation catalysts such as Pt, Pd, Rh.

When the harmful substance is hydrogen in the gaseous phase, palladium oxide, cobalt oxide, ternary alloys among zirconium, vanadium and iron sold by the applicant under the name St 707, ternary alloys among zirconium, cobalt and rare earths, sold by the applicant under the name St 787, or more generally non-evaporable getter alloys or unsaturated organic compounds may be used.

When the harmful substances are saturated or unsaturated hydrocarbons, referring in particular but not exclusively to methane, propylene, ethane and propane, active carbons having a large specific surface area, carbon nanotubes, oxidizing compounds like $KMnO_4$ or combinations thereof may be used.

When the harmful substance is oxygen, it is possible to use ternary alloys among zirconium, vanadium and iron sold by the applicant under the name St 707, ternary alloys among zirconium, cobalt and rare earths, sold by the applicant under the name St 787, or more generally non-evaporable getter alloys. Alternatively, metals may be used, among which nickel, copper, iron are preferred; or reduced or partially reduced metal oxides are preferred, among which iron, nickel, tin, copper oxides or combinations thereof are preferred.

When the harmful substance is HF, oxides in general may be used, with particular reference to oxides of alkaline or alkaline-earth metals, among which the use of magnesium oxide is preferred.

The means for sorbing harmful substances that are suitable for the manufacturing of the rechargeable batteries object of the present invention, may comprise one or more getter materials on the basis of the harmful substance that must be removed from the battery. In particular, the expected composition of such substances produced during the operation of the battery may vary according to the type of rechargeable battery and to its conditions of use, whereby it is possible to choose a mix of getter powders according to the battery type in an optimum manner.

Getter material particles must have a size lower than 150 µm, preferably lower than 50 µm in the case of non-evaporable getter alloys, preferably lower than 25 µm in the case of salts, oxides and zeolites, preferably lower than 100 µm when carbon nanotubes or organic compounds are used.

Another very relevant parameter is given by the thickness of the two polymeric layers forming the getter system. In particular the thickness of the polymeric layer containing the getter material must be comprised between 5 and 200 µm on the basis of the getter particle size (in particular, the thickness must necessarily be higher than the size of the getter material particles), and preferably between 10 and 100 µm, while as to the external protective layer its thickness may be comprised between 1 and 50 µm and preferably between 2 and 20 µm.

The rechargeable lithium batteries of the present invention are preferably made by arranging the getter system for the sorption of harmful substances along one or more inner walls, or portions thereof, of the airtight containers.

For instance, FIG. 4 shows a cross-sectional view of the inside of a lithium battery 40 having a cylindrical shape and comprising an airtight container 41 inside which two electrodes are present in the form of thin sheets wound to form a spiral 42 immersed in a liquid electrolyte (not shown). A multilayer sheet 43 is arranged against the inner wall of this battery. The sheet may be any of the sheets shown with reference to FIGS. 1, 2 and 3. The battery shown in FIG. 4 has a cylindrical geometry, but this geometry is non binding for the realization of the invention, e.g. another preferred geometrical shape for these batteries is the parallelepiped.

A possible alternative embodiment for this geometry (not shown in the drawing) provides for arranging the multilayer sheet 43 at the centre of the battery, where the spiral of the electrodes has its origin.

In FIG. 5 another preferred geometry for lithium batteries is shown. In this case the structure of battery 50 comprises electrodes 52, 52', . . . , (only the two outermost electrodes have been illustrated in order not to jeopardize the understanding of the drawing) in the form of parallel metallic plates separated by an electrolytic solution (not shown). On one side of this battery the system 53 for the sorption of harmful gases is arranged. The electrical contacts 54 and 54' communicate the electrodes with the outside of the airtight container 51 of the rechargeable lithium battery.

The invention claimed is:

1. A rechargeable lithium battery comprising
an airtight container,
electrodes immersed in an electrolytic solution, said electrodes being spaced apart by means of one or more separators,
electrical contacts connected to the electrodes and
a multilayer polymeric sheet formed of i) an inner layer of a polymeric material containing particles of one or more getter materials for sorption of harmful substances, and ii) at least one external protective layer of a polymeric material impermeable to electrolyte of the electrolytic solution,
wherein
weight percentage of said particles of one or more getter materials in said inner layer of polymeric material is lower than 50%,
the inner layer and the at least one external protective layer are permeable to said harmful substances,
and the getter material is completely enclosed preventing access of the electrolyte to the getter material.

2. The rechargeable lithium battery according to claim 1, wherein said particles of one or more getter materials have a size lower than 150 µm.

3. The rechargeable lithium battery according to claim 1, wherein said at least one external protective layer and said inner layer are made of a material chosen between polyolefins and fluorinate polymers.

4. The rechargeable lithium battery according to claim 3, wherein said polyolefins are chosen among polypropylene (PP), low-density polyethylene (LDPE), polystyrene and thermoplastic olefins (TPE).

5. The rechargeable lithium battery according to claim 3, wherein said fluorinated-polymer is polytetrafluorethylene (PTFE).

6. The rechargeable lithium battery according to claim 3, wherein the at least one external protective layer and the inner layer are made of the same polymeric material.

7. The rechargeable lithium battery according to claim 1, wherein said inner layer is made of ethyl-vinyl-acetate or polyesters.

8. The rechargeable lithium battery according to claim 7, wherein said polyesters comprise polycarbonate.

9. The rechargeable lithium battery according to claim 1, wherein said harmful substances comprise $H_2O$ and said getter material comprises one or more of the following compounds: oxides of alkaline-earth metals, boron oxides and zeolites.

10. The rechargeable lithium battery according to claim 9, wherein said oxide of an alkaline-earth metal is calcium oxide.

11. The rechargeable lithium battery according to claim 1, wherein said harmful substances comprise $CO_2$ and said getter material comprises one or more of: carbon molecular sieves (CMS), hydroxides of alkaline or alkaline-earth metals or lithium salts identified by the formula $LiXO_y$, with X chosen among zirconium, iron, nickel, titanium, silicon and y comprised between 2 and 4, Metal Organic Framework modified by addition of basic functional groups.

12. The rechargeable lithium battery according to claim 11, wherein the basic functional croups comprise aminic groups.

13. The rechargeable lithium battery according to claim 1, wherein said harmful substances comprise CO and said getter material comprises one or more of the following compounds: cobalt oxide, copper oxide, and potassium permanganate.

14. The rechargeable lithium battery according to claim 13, wherein said getter material is used together with oxidation catalysts chosen among platinum, palladium and rhodium.

15. The rechargeable lithium battery according to claim 13, wherein said getter material is used together with a getter material for removal of $CO_2$.

16. The rechargeable lithium battery according to claim 1 wherein said harmful substances comprise saturated and unsaturated hydrocarbons and said getter material comprises one or more of: carbon nanotubes, active carbons having a large surface area and oxidizing compounds.

17. The rechargeable lithium battery according to claim 16, wherein said oxidizing compounds comprise potassium permanganate ($KMnO_4$).

18. The rechargeable lithium battery according to claim 1, wherein said harmful substances comprise $O_2$ and said getter material comprises one or more of: ternary alloys among zirconium, vanadium and iron, ternary alloys among zirconium, cobalt and rare earths, and reduced or partially reduced metals or metal oxides.

19. The rechargeable lithium battery according to claim 18, wherein said metals are nickel, copper, iron, tin and combinations thereof.

20. The rechargeable lithium battery according to claim 18, wherein said reduced or partially reduced metal oxides are nickel oxide, copper oxide, iron oxide and combinations thereof.

21. The rechargeable lithium battery according to claim 1, wherein said harmful substances comprise HP and said getter material comprises oxides.

22. The rechargeable lithium battery according to claim 21, wherein said oxides comprise oxides of alkaline or alkaline-earth metals.

23. The rechargeable lithium battery according to claim 22, wherein said alkaline-earth metal oxide is magnesium oxide.

24. The rechargeable lithium battery according to claim 1, wherein said harmful substances comprise hydrogen in a gaseous phase and said getter material comprises non-evaporable getter alloys.

25. The rechargeable lithium battery according to claim 1, wherein said harmful substances comprise hydrogen in a gaseous phase and said getter material comprises unsaturated organic compounds.

26. The rechargeable lithium battery according to claim 1, wherein said harmful substances comprise hydrogen in a gaseous phase and said getter material comprises one or more of: palladium oxide, cobalt oxide, zirconium-vanadium-iron ternary alloys, and zirconium-cobalt-rare earths ternary alloys.

27. The rechargeable lithium battery according to claim 1, wherein thickness of said at least one external protective layer is comprised between 1 and 50 μm.

28. The rechargeable lithium battery according to claim 27, wherein the thickness of said at least one external protective layer is comprised between 2 and 20 μm.

29. The rechargeable lithium battery according to claim 1, wherein said inner layer has a thickness comprised between 5 and 200 μm.

30. Me rechargeable lithium battery according to claim 29, wherein said inner layer has a thickness comprised between 10 and 100 μm.

31. The rechargeable lithium battery according to claim 1, wherein said multilayer polymeric sheet is arranged along one or more inner walls of said airtight container.

\* \* \* \* \*